US008751372B1

(12) United States Patent
Friedman et al.

(10) Patent No.: US 8,751,372 B1
(45) Date of Patent: Jun. 10, 2014

(54) COMPLIANCE DATA MANAGEMENT SYSTEMS AND METHODS

(71) Applicant: Trillium Labs, LLC, New York, NY (US)

(72) Inventors: Michael Friedman, New York, NY (US); Lee Maschler, Skillman, NJ (US); Erik Gordon, West Windsor, NJ (US); Albi Kavo, Clifton, NJ (US); Benjamin Peikes, Brooklyn, NY (US); Oliver Daniel, Brooklyn, NY (US)

(73) Assignee: Trillium Labs, LLC, New York, NY (US)

( * ) Notice: Subject to any disclaimer, the term of this patent is extended or adjusted under 35 U.S.C. 154(b) by 0 days.

(21) Appl. No.: 14/083,271

(22) Filed: Nov. 18, 2013

Related U.S. Application Data

(63) Continuation of application No. 14/025,641, filed on Sep. 12, 2013.

(51) Int. Cl.
*G06Q 40/00* (2012.01)
*G06Q 40/02* (2012.01)
*G06Q 40/04* (2012.01)
*G06Q 40/06* (2012.01)

(52) U.S. Cl.
CPC ................... *G06Q 40/00* (2013.01); *G06Q 40/02* (2013.01); *G06Q 40/04* (2013.01); *G06Q 40/06* (2013.01)
USPC .......................................................... 705/37

(58) Field of Classification Search
CPC ... G06Q 10/0637; G06Q 20/40; G06Q 20/10; G06Q 30/08; G06Q 30/0225; G06Q 40/04; G06Q 40/00; G06Q 40/06; G06Q 40/12; G06Q 40/02; G06Q 40/025; G06Q 40/08
See application file for complete search history.

(56) References Cited

U.S. PATENT DOCUMENTS

| 7,693,780 | B2 | 4/2010 | Stearns |
| 8,103,575 | B1 | 1/2012 | Hinkle et al. |
| 8,321,320 | B1 | 11/2012 | Lurtz et al. |
| 8,407,133 | B2 | 3/2013 | Doornebos et al. |

(Continued)

OTHER PUBLICATIONS

Committee of European Securities Regulators ("CESR"); Waivers from Pre-trade Transparancy Obligations under the Market in Financial Instruments Directive (MiFID); available at www.cesr.eu; (May 20, 2009).*

(Continued)

*Primary Examiner* — Virpi Kanervo
(74) *Attorney, Agent, or Firm* — Winston & Strawn LLP

(57) ABSTRACT

A method and system for detecting potentially manipulative order patterns and assisting compliance professionals with analyzing and determining whether remedial actions are required with respect to such patterns to comply with governing regulations. The method includes receiving market-wide data from different sources of marketplace data, receiving local order data and accounts corresponding to local trading activity, applying a compliance event detection module to the local order data and market-wide data, integrating a portion of the market-wide and the local order data into a combined stream, comparing the state of one account's local order book to the state of the market-wide order book, identifying a concentration of the local order book on one side, identifying a compliance-related event, generating a score associated with a compliance-related event, and providing a user-interactive interface that displays the state of the local market order book, the market-wide order book, and a compliance related event.

26 Claims, 11 Drawing Sheets

(56) References Cited

U.S. PATENT DOCUMENTS

| | | | |
|---|---|---|---|
| 8,429,059 | B2 | 4/2013 | Rosenthal |
| 2003/0040955 | A1 | 2/2003 | Anaya et al. |
| 2003/0050879 | A1 | 3/2003 | Rosen et al. |
| 2005/0149428 | A1* | 7/2005 | Gooch et al. ............. 705/37 |
| 2006/0184444 | A1 | 8/2006 | McConaughy et al. |
| 2007/0244792 | A1 | 10/2007 | Couperier et al. |
| 2008/0086409 | A1* | 4/2008 | Moorman et al. ............. 705/38 |
| 2010/0180034 | A1* | 7/2010 | Weiner et al. ............. 709/226 |
| 2012/0109812 | A1 | 5/2012 | Hinkle et al. |
| 2012/0144240 | A1* | 6/2012 | Rentschler et al. ............. 714/34 |
| 2013/0030979 | A1 | 1/2013 | Annunziata et al. |

OTHER PUBLICATIONS

Kathleen M. Kahle; Insider Trading and the Long-run Performance of New Security Issues; Journal of Corporate Finance; vol. 6, pp. 25-53; (2000).*

Zabihollah Rezaee; Causes, Consequences, and Deterence of Financial Statement Fraud; Critical Perspectives of Accounting; vol. 16, pp. 277-298; (2005).*

Scila Compliance, Taking the pain out of compliance, Multi-asset trade surveillance—without headaches, Connober Financial Technology AB http://www.cinnober.com/sites/cinnober.com/files/page/Scila-Compliance-Product-sheet.pdf.

Lars-Ivar Sellberg Surveilance of algorithmic trading, A proposal for how to monitor trading algorithms, Scila AB, Rev 1.2 Jan. 16, 2013, http://scila.se/wp-content/uploads/2013/01/SurveillanceOfAlgorithms.pdf.

Compliance & Tax, Protegent, Sungard 's Financial Systems, (2 pages) Sungard Protegent (http://financialsystems.sungard.com/solutions/compliance-tax/protegent).

Trading Interaction Surveillance, Design by LightMix.com Copyright 2003-2013 Actimize Inc. (2 pages) Nice Actimize (http://www.niceactimize.com/index.aspx?page=solutionscompliancetradinginteraction).

Middle Office—Risk and Compliance Fidessa (http://www.fidessa.com/products/sell-side-solutions/middle-office-risk-and-compliance).

Smarts Broker is the complete compliance, solution for brokers, Surveillance and Compliance, 2013, The NASDAQ OMX Group, Inc., NASDAQ Smarts (2 pages) (http://www.nasdaqomx.com/technology/marketplacesolutions/surveillancecompliance/.

Scila Compliance, Easier compliance—Efficient compliance—without headaches, Better trading, Connober Financial Technology AB, http://scila.se/wp-content/uploads/2012/05/Scila Compliance.pdf.

(This is an audio demo—not a document) Link to video: http://www.tradeworx.com/media/video/booklet_demo2.wmv.

Market Structure Research, U.S. Securities and Exchange Commission,The Speed of the Equity Markets, Data Highlight May 2013, Oct. 9, 2013 http://www.sec.gov/marketstructure/research/highlight-2013-05.html[Mar. 12, 2014 10:58:53 AM].

Market Structure Research, U.S. Securities and Exchange Commission,Trade to Order Volume Ratios, Data Highlight Jan. 2013, Oct. 9, 2013 http://www.sec.gov/marketstructure/research/highlight-2013-01.html[Mar. 12, 2014 11:02:10 AM].

Peter J. Henning, Markets Evolve, as Does Financial Fraud, Investment Banking, White Collar Watch, Deal B%k, New York Times.com, Nov. 11, 2013 http://dealbook.nytimes.com/2013/11/11/markets-evolve-as-does-financial-fraud/?_php=true&_type=blogs&_php=true&_type=blogs&_r=1[Mar. 12, 2014 10:26:35 AM].

* cited by examiner

FIG. 8B

COMPLIANCE DATA MANAGEMENT SYSTEMS AND METHODS

CROSS REFERENCE TO RELATED APPLICATION

The present application is a continuation of U.S. patent application Ser. No. 14/025,641 filed on Sep. 12, 2013, the entire disclosure of which is hereby incorporated by reference.

FIELD OF THE INVENTION

The present invention relates to financial security or similar orders. More specifically, detecting manipulative order patterns by identifying and facilitating the analysis of local orders that exceed certain allowable concentration thresholds within the market-wide visible order book.

BACKGROUND OF THE INVENTION

Securities market participants regularly place high volumes of offers or orders to buy or sell securities within thousandths (milliseconds) or even millionths (microseconds) of a second. Orders may be designated by the offering account as visible—published to other market participants on public trading venues—or hidden—concealed from other market participants, either within public trading venues or in private "dark pools" until a matching counterparty appears and the order is executed. The vast majority of all orders—visible and hidden—are rapidly cancelled by the offering account without being executed.

During the time that visible orders are open—even if only for milliseconds or microseconds—they can impact market prices. Ordinarily, the impact of visible orders on market prices is the natural result of basic microeconomic principles. The publication of a single offer to buy a security exerts some upward pressure—perhaps negligible—on the price of the security, and vice versa. This phenomenon is expected and legitimate.

However, regulators in the United States and abroad have recently documented instances of market participants unlawfully manipulating market prices by placing and subsequently cancelling multiple orders on one side of the market with the intent of creating the appearance of bona fide supply or demand, thereby pushing market prices to levels at which the participant can obtain opposite-side executions at more favorable prices than would have otherwise been possible. This practice has been variously labeled by regulators as "layering" or "spoofing."

Regulators have required market participants who are responsible for either originating orders or transmitting orders to trading venues to monitor the orders they originate or transmit to detect and prevent manipulative order patterns, including but not limited to layering and spoofing. Many of the accounts subject to these requirements routinely generate or transmit high volumes of orders to trading venues each second, which makes it difficult to monitor. Existing systems have been deficient in appropriately meeting these and other technical problems.

Therefore, there is a need for a system and method that provides an automated monitoring of local order data to detect potentially manipulative order patterns and to assist compliance professionals to analyze and determine whether remedial actions are required with respect to such patterns to comply with governing regulations.

SUMMARY OF THE INVENTION

In accordance with principles of the present invention, systems, methods, and computer readable medium are provided that implement a compliance management tool for managing the trading behavior of individuals or groups of traders.

A computer-implemented method can be directed towards detecting, identifying, and addressing local trading behavior that signifies compliance concerns. The method comprises, in a compliance system, receiving market-wide order data from a plurality of different sources of marketplace data, wherein the market-wide data comprises a market-wide history of market-wide order book states in correspondence with an incrementing external timestamp. The method also comprises consolidating the market-wide order data from the different sources into a consolidated stream of order book states. The method further comprises storing the consolidated stream of market-wide order data in a first database. The method comprises, in the compliance system, receiving local order data, wherein the local order data comprises data that identifies local order book states and a corresponding local timestamp, and wherein at least a portion of the local order book data comprises a history of local orders in correspondence with the local timestamp and including one or more hidden local orders. The hidden orders can be received from a source external to the different sources of marketplace data. The method also comprises storing the local order data in a second database. The method also comprises receiving a list of accounts corresponding to local trading activity. The method further comprises implementing a compliance event detection module in the compliance system using a filtering tool. The method comprises in the compliance system, applying the compliance event detection module to the stored local order data and market-wide order data. The applying step comprises integrating a portion of the market-wide order data and a portion of the local order data into a combined stream of local order and market-wide order states. The applying step further comprises comparing, at a particular time reference (e.g., external timestamp, local timestamp or some other time offset), the state of at least one account's local order book in a listed security (i.e., any financial product for which a list of active offers to buy or sell is publicly available or available for purchase, including without limitation: stocks, bonds, exchange traded funds, currency, futures, options, derivatives) to the state of the market-wide order book in that listed security. The applying step also comprises in response to comparing, identifying a concentration of the local order book on one side of the order book. The applying step further comprises identifying an individual compliance event, by applying a plurality of factors to the state of the account's local order book in the listed security and the state of the market-wide order book in the listed security, and in response, identifying a compliance-related event based on the identified concentration, one or more local orders by the account on the other side of the order book, a corresponding local timestamp, one or more compliance threshold requirements that are variable based on the particular listed security, and a corresponding external timestamp. The applying step also comprises generating a score in association with the compliance-related event, wherein the score represents a corresponding level of significance of the event. The method also comprises providing a user-interactive interface that displays a view of the combined stream of local order and market-wide order states during the compliance-related event, marks the compliance-related event. In some embodiments, the viewer provides the user with the ability to sequentially select to move through the stream and view the combined stream in graphical and/or table formats (or either format) before, during, and after the compliance-related event. If desired, one view is displayed at a time and if desired, a sequential stepping capability can be available in one of the views such as the graphical view.

In one embodiment, the method also comprises processing market-wide data and local order data and determining that a subsequent event in the local order book of that account is part of an identified compliance-related event. In another embodiment, the method comprises identifying the compliance-related event based on a number of price levels used by the account and a quantity of local orders by the account in connection with that particular financial traded product.

In another embodiment, the method further comprises processing and setting filtering or processing parameters associated with each account, data source, or listed security. In another embodiment, the method comprises receiving market-wide data from an external network and receiving local market data from an internal log of local trading activity. In one embodiment, the internal log is received from an external network that is separate from the external network for the market-wide data, wherein the internal log is generated and maintained by a network that receives the local orders for transmission to exchanges. In yet another embodiment, a portion of the steps are performed using an online storage service such as using one over the Internet that is protected by a firewall. In one embodiment, the method comprises providing the user with the option to select and save a threshold criteria for each particular listed security that will trigger the identification of the compliance-related event for that listed security. In yet another embodiment, the method comprises considering a plurality of accounts as if they were a single account and providing the user with the option to select which accounts should be included in the view. In one embodiment, the method further comprises implementing the compliance event detection module to automatically process local market data on a periodic basis and identify a plurality of compliance-related events and an associated score for each. In yet another embodiment, the method further comprises automatically applying the module on a day-after trading basis. In another embodiment, the method also comprises combining different groups of accounts and applying the module to evaluate whether a compliance-related event has occurred. In one embodiment, the external timestamp and the local timestamp are from separate clocks without having a synchronization relationship.

A system can be provided that is directed towards detecting, identifying, and addressing local trading behavior that signifies compliance concerns. The system comprises a market order component, a first database, a local order server, a compliance event detection module, a second database and a viewer component. The market order component is configured to receive market-wide order data from a plurality of different sources of marketplace data, wherein the market-wide data comprises a market-wide history of market-wide order book states in correspondence with an incrementing external timestamp. The market order component is also configured to consolidate the market-wide order data from the different sources into a consolidated stream of order book states.

The first database is configured to store the consolidated stream of market-wide order data. The local order server is configured to receive local order data, wherein the local order data comprises data that identifies local order book states and a corresponding local timestamp, and wherein at least a portion of the local order book data comprises a history of local orders in correspondence with the local timestamp and including one or more hidden local orders. Hidden orders can be received from a source external to the different sources of marketplace data. The local order server is also configured to receive a list of accounts corresponding to local trading activity. The compliance event detection module is configured to apply the compliance event detection module to the stored local order data and market-wide order data. The applying step further comprises integrating a portion of the market-wide order data and a portion of the local order data into a combined stream of local order and market-wide order states. The applying step further comprises comparing, at a particular time reference (e.g., external timestamp, local timestamp or some other time offset), the state of at least one account's local order book in a listed security (e.g., commodity, instrument) to the state of the market-wide order book in that listed security. The applying step also comprises, in response to comparing, identifying a concentration of the local order book on one side of the order book. The applying step further comprises identifying an individual compliance event, by applying a plurality of factors to the state of the account's local order book in the listed security and the state of the market-wide order book in the listed security, and in response, identifying a compliance-related event based on the identified concentration, one or more local orders by the account on the other side of the order book, a corresponding local timestamp, one or more compliance threshold requirements that are variable based on the particular listed security, and a corresponding external timestamp. The applying step also comprises generating a score in association with the compliance-related event, wherein the score represents a corresponding level of significance of the event. The second database is configured to store the local order data. The viewer component is configured to provide a user-interactive interface that displays a view of the combined stream of local order and market-wide order states during the compliance-related event, marks the compliance-related event. If desired, the viewer provides the user with the ability to sequentially select to move through the stream and view the combined stream in graphical and/or table formats (or either format) during the compliance-related event. If desired, one view is displayed at a time and if desired, a sequential stepping capability can be available in one of the views such as the graphical view.

In one embodiment, the compliance event detection module is also configured to process market-wide data and local order data and determine that a subsequent event in the local order book of that account is part of an identified compliance-related event. In another embodiment, the compliance event detection module is further configured to identify the compliance-related event based on a number of price levels used by the account and a quantity of local orders by the account in connection with that particular financial traded product. In yet another embodiment, the event comprises a start time for the event. In another embodiment, the market order component is further configured to translate the market-wide data into an optimized format.

In another embodiment, the compliance event detection module is further configured to process and set filtering or process parameters associated with each account, data source, or listed security. In another embodiment, the market order component is further configured to receive market-wide data from an external network and the local order server is further configured to receive local market data from an internal log of local trading activity. In one embodiment, the internal log is received from an external network that is separate from the external network for the market-wide data, wherein the internal log is generated and maintained by a network that receives the local orders for transmission to exchanges. In yet another embodiment, a portion of the steps are performed using an online storage service such as one that is available over the Internet and is protected by a firewall. In one embodiment, the viewer component is configured to provide the user with the option to select and save a threshold criteria for each particular listed security that will trigger generating the signal for that listed security. In yet another embodiment, the viewer component is further configured to consider a plurality of accounts as if they were one account and provide the user with the option to select which accounts should be included in the view. In one embodiment, the compliance event detection module is further configured to automatically process local market data on a periodic basis and identify a plurality of compliance-related events and an associated score for each. In yet another embodiment, the compliance event detection module is further configured to automatically apply the module on a day-after trading basis. In another embodiment, the compliance event detection module is also configured to combine different groups of accounts and apply the module to evaluate whether a compliance-related event has occurred. In one embodiment, the external timestamp and the local timestamp are from separate clocks without having a synchronization relationship.

A computer-readable storage medium such a non-transitory computer readable medium can comprise instructions executed by a processor or electronic device to perform at least some of the steps of at least some of the methods described above.

It will be understood by those of ordinary skill in the art after reading the disclosure and as expressed herein that if desired, one or more features of elements of the exemplary system, method, or computer readable medium can be removed, modified, or re-arranged to arrive at a broader or different version of the system, method, or computer readable medium without departing from the spirit and scope of the invention.

BRIEF DESCRIPTION OF DRAWINGS

Further advantageous features of the present invention will become more apparent with the following detailed description when taken with reference to the accompanying drawings in which:

FIGS. 8A and 8B (collectively, FIG. 8) illustrates an exemplary screenshot of the viewer system of the present invention, in accordance with one embodiment of the present invention;

DETAILED DESCRIPTION OF THE PREFERRED EMBODIMENTS

Figure 1:
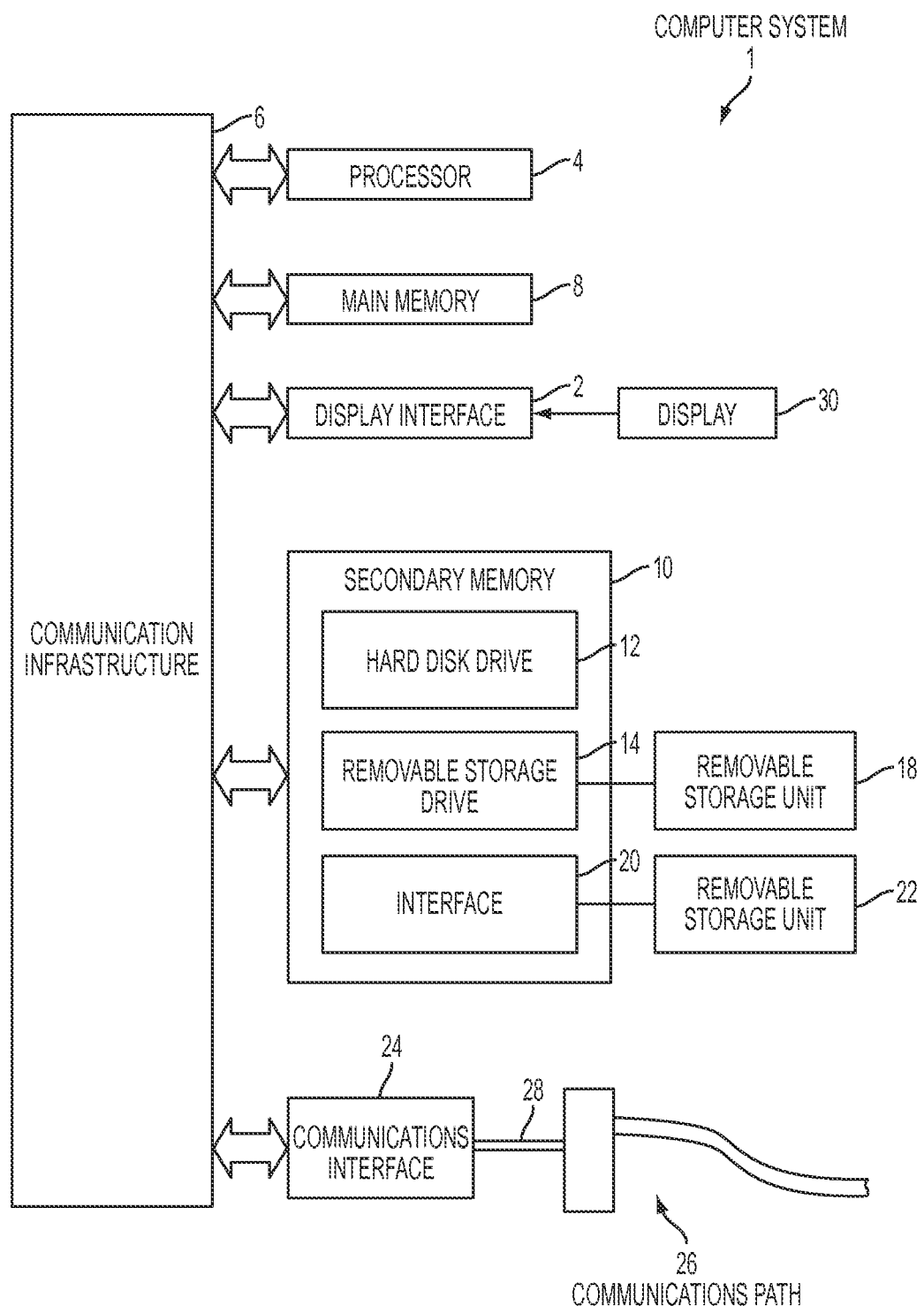
FIG. 1 illustrates a block diagram with various computer system components for use with an exemplary implementation of a system for comparing local securities order data to market-wide order data, in accordance with one embodiment of the present invention.

In accordance with some principles of the present invention, a system and method of comparing local securities order data to market-wide order data can be provided.

Systems and methods can be implemented that detect potentially manipulative order patterns by identifying, and facilitating the analysis of, instances in which the user's own orders (the orders generated by a user or the user's customers) exceed certain allowable concentration thresholds within the market-wide visible order book.

A filtering tool gathers all visible proprietary depth-of-book market data feeds made available by public trading venues and processes it into a consolidated market-wide order book. The filtering tool may simultaneously process the user's own local visible and hidden order flow. The filtering tool may then compare the processed market-wide order data to the local data and identify events during which the local order flow is potentially exerting undue influence on market-wide pricing. Each event may be scored based upon the percentage of the active portion of the visible order book occupied by the user, the price levels of the local orders relative to the best available prices, whether the best available prices moved in the direction predicted by microeconomic principles during the event, and whether the user had open orders on both sides of the market during the event. Essentially, one embodiment of the present invention is to provide post-trade analytics level on pre-trade (order) data.

Reported exceptions may be presented to the user for further analysis using a viewing tool. The viewing tool may be a graphical user interface that displays: (a) a time vs. price chart of the subject security showing both the best visible buy (bid) and sell (ask) prices at all times within a user-defined period; (b) a time vs. volume chart showing the number of total market-wide and local orders considered by the filtering tool at each millisecond; (c) a sliding vertical indicator bar showing on the two above charts the particular time being analyzed; (d) a table showing both the market-wide order book and the portion of that book attributable to the user's orders at each price level within the book at the precise time indicated by the vertical indicator bar; and (e) a table showing all of the user's visible and hidden orders in the subject security within a broader time frame surrounding the precise time indicated by the vertical indicator bar, and whether each of those orders was executed.

By scrolling through the changes in the market-wide order book surrounding the reported exceptions using the viewing tool, the user may be able to determine whether the user's orders correlate to a change in the market price for the subject security in the direction opposite the concentration of the user's orders. If the user's orders do correlate to price movements away from the user's concentrated orders, and the user also entered other orders—visible or hidden—on the opposite side of the market from the user's concentrated orders, a layering or other regulatory violation has likely occurred.

The viewing tool may automatically use its user's activities for audit trail purposes. If the user determines that a potential violation has occurred, the viewing tool may generate an escalation report of the event in question in a portable document format for the user to send to other relevant professionals, showing the orders that triggered the event in a format similar to the viewing tool.

As shown in FIG. 1, the present invention may be implemented using hardware, software, or a combination thereof, and may be implemented in one or more computer systems or other processing systems. In one embodiment, the invention is directed toward one or more computer systems capable of carrying out the functionality described herein.

FIG. 1 shows a computer system 1 that includes one or more processors, such as processor 4. The processor 4 is connected to a communication infrastructure 6 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1 can include a display interface 2 that forwards graphics, text, and other data from the communication infrastructure 6 (or from a frame buffer not shown) for display on the display unit 30. As such, computer system can generate signals or control the generation and display of graphics, GUI, other visuals or related interactivity on an attached display or a remote computer system (e.g., a PC client through a web browser). Computer system 1 also includes a main memory 8, preferably random access memory (RAM), and may also include a secondary memory 10. The secondary memory 10 may include, for example, a hard disk drive 12 and/or a removable storage drive 14, representing a floppy disk drive, a magnetic tape drive, an optical disk drive, etc. The removable storage drive 14 reads from and/or writes to a removable storage unit 18 in a well known manner. Removable storage unit 18, represents a floppy disk, magnetic tape, optical disk, etc., which is read by and written to removable storage drive 14. As will be appreciated, the removable storage unit 18 includes a computer usable storage medium having stored therein computer software and/or data.

In alternative embodiments, secondary memory 10 may include other similar devices for allowing computer programs or other instructions to be loaded into computer system 1. Such devices may include, for example, a removable storage unit 22 and an interface 20. Examples of such may include a program cartridge and cartridge interface (such as that found in video game devices), a removable memory chip (such as an erasable programmable read only memory (EPROM), or programmable read only memory (PROM)) and associated socket, and other removable storage units 22 and interfaces 20, which allow software and data to be transferred from the removable storage unit 22 to computer system 1.

Computer system 1 may also include a communications interface 24. Communications interface 24 allows software and data to be transferred between computer system 1 and external devices. Examples of communications interface 24 may include a modem, a network interface (such as an Ethernet card), a communications port, a Personal Computer Memory Card International Association (PCMCIA) slot and card, etc. Software and data transferred via communications interface 24 are in the form of signals 28, which may be electronic, electromagnetic, optical or other signals capable of being received by communications interface 24. These signals 28 are provided to communications interface 24 via a communications path (e.g., channel) 26. This path 26 carries signals 28 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 14, a hard disk installed in hard disk drive 12, and signals 28. These computer program products provide software to the computer system 1.

Computer programs (also referred to as computer control logic) are stored in main memory 8 and/or secondary memory 10. Computer programs may also be received via communications interface 24. Such computer programs, when executed, enable the computer system 1 to perform the features of embodiments of the present invention, as discussed herein. In particular, the computer programs, when executed, enable the processor 4 to perform such features. Accordingly, such computer programs represent controllers of the computer system 1.

In an embodiment where the invention is implemented using software, the software may be stored in a computer program product and loaded into computer system 1 using removable storage drive 14, hard drive 12, or communications interface 24. The control logic (software), when executed by the processor 4, causes the processor 4 to perform the functions or features described herein. In another embodiment, the features are implemented primarily in hardware using, for example, hardware components, such as application specific integrated circuits (ASICs). Implementation of the hardware state machine so as to perform the functions described herein will be apparent to persons skilled in the relevant art(s). In yet another embodiment, a combination of both hardware and software can be used.

A computer system can be used that comprises one or more computers or computer systems. Depending on the arrangement, a display unit that is attached to the computer system (e.g., using a VGA cable) or to one of the computer systems may not be necessary.

As shown in FIG. 1, embodiments of the present invention may be implemented using hardware, software, or a combination thereof, and may be implemented in one or more computer systems or other processing systems. In one embodiment, one or more computer systems are capable of carrying out the functionality described herein. The components of embodiments of the present invention may include many different types of computing devices, such as a personal computer (PC), minicomputer, mainframe computer, microcomputer, telephonic device, or wireless device, such as a hand-held wireless device coupled to a server, such as a PC, minicomputer, mainframe computer, microcomputer, or other device having a processor and a repository for data and/or connection to a processor and/or repository for data, via, for example, a network, such as the Internet or an intranet. The connection may be facilitated by means of wired, wireless, or fiber optic links. In another embodiment, the method and system of the present invention operate in a stand-alone environment, such as on a single terminal.

Figure 2:
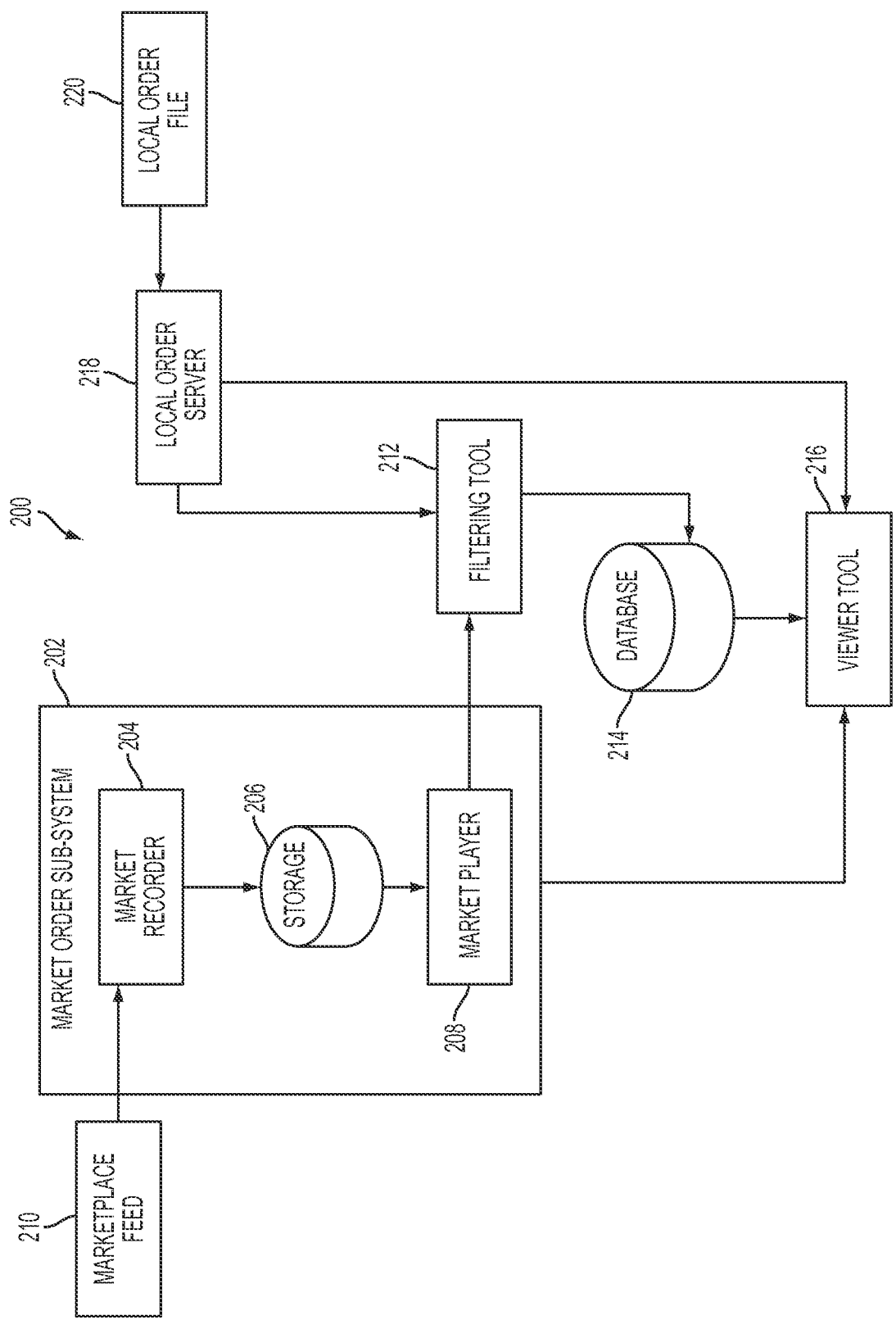
FIG. 2 illustrates a block diagram with various computer system components for use with an exemplary implementation of a system for comparing local securities order data to market-wide order data, in accordance with one embodiment of the present invention.

FIG. 2 shows a system 200 that includes one or more components that includes one or more servers, computers, storage devices, etc. The components may be connected to a communication infrastructure (e.g., a communications bus, cross-over bar, or network). Various software embodiments are described in terms of this exemplary system. After reading this description, it will become apparent to a person skilled in the relevant art(s) how to implement this and other embodiments using other computer systems and/or architectures.

System 200 includes a market order sub-system 202, a filtering tool 212, a database 214, a viewer tool 216, and inputs marketplace feed 210 and local order file 220. System 200 is not limited to only these components. A compliance system may include one or more components, including but not limited to a filtering tool, a market-order sub-system, a database, and a viewer tool. The market order sub-system 202 may transform the publicly available market-wide Level II order data into a normalized, sequenced stream. A typical Level II feed may disseminate data as a series of updates to each market order, which means it might be necessary to process the stream from the beginning of the day in order to construct the book at a particular time. The normalized stream produced by the market order sub-system may remove or relax the aforementioned restriction by means of a suitable output format.

The market order sub-system 202 may also serve the formatted data to be used as input by the filtering tool 212 and the viewer tool 216. The market order sub-system 202 may include a market recorder 204, a storage device 206, and a market player 208. The market order sub-system 202 may be configured to receive multiple marketplace feeds 210. In one embodiment, the market recorder 204 may receive the marketplace feeds 210.

The market recorder 204 may be in communication with the storage device 206 and the storage device 206 may be in communication with the market player 208. It should be appreciated that the present invention is not limited to only this configuration and that each device or component may be in communication or connected to any other device. The market recorder 204 may retrieve market-wide data from multiple marketplaces (the marketplace feed 210) and translate the data into an optimized format. The received market-wide data can be a market-wide history of market-wide order books for a listed security or as many listed securities as desired such as all available listed securities. The market-wide order book and received data can comprise limit orders (e.g., limit orders excluding local or hidden orders). The source of market-wide data may be from different servers that are external to the market recorder or its local network (e.g., a network connection to the different marketplace sources in other network domains). An exchange that handled the data can associate a timestamp generated using their computer system and clock. The timestamp can be distributed as part of the market-wide and would reflect an external timestamp. The market recorder 204 may also sequence the data from all of the marketplaces into a consolidated stream. The stream may be saved to the storage device 206 for access by other components, including the market player 208. The market order sub-system 202 may be in communication with the filtering tool 212 and the viewer tool 216. The market recorder 204 will be discussed in more detail below.

The market player 208 may serve data requests originating from the filtering tool 212 or the viewer tool 216. The data requests may have been generated by the market recorder 204 and may be read from the storage device 206. The local order server 218 may retrieve local order data from each user through drop files or local order feeds 220. Local order file 220, local order server 218, or an associated device may be include a database for storing the local order data for a listed security. The local order data may be order data that is generated by the individual accounts local to the user's organization and collected by the organization. The local order data collection and the compliance tool may be implemented in a network of the user's organization for the purpose of self-monitoring local trading behavior. If desired, the local order data may be received from a plurality of organizations in the compliance system. The other organizations can transmit their local order data to the compliance system so as to be able to self-monitor their own local trading behavior using the compliance system as an external service. This provides each organization the ability to self-regulate by sending their local orders to the service provider for application in the compliance tools of the compliance system. The service provider can gain the benefit of collecting and storing market-wide data and using it for each of the other organizations with that organization's local order data. Thus providing significant operational efficiencies. Security measures would be implemented to make sure each organization's data is private and secure. The local order server 208 may receive different order files and feeds into logical "local feeds," which may be the result of the combination of several physical feeds. The local order data is received and stored in the system. The local order data can include data that identifies the local order book states and a corresponding local timestamp for each state. A state can be the bid and/or ask orders that are pending in the system for execution at a particular time or window of time. The stored local order book data can include a history of local trade orders in correspondence with the local timestamp and include one or more hidden local orders. The local or hidden local order data, as shown, is received from a different source of data than the source of marketplace (e.g., a plurality of different marketplace data). Hidden orders are orders that are not visible from the market to the trader's of a particular listed security during "live" trading. Hidden orders include immediate-or-cancel orders "IOC" or orders that are designated to be hidden from the market pending the entry of matching public or hidden order on the other side of the market. This can be data that is locally recorded by an organization or their broker and is available for self-monitoring by the organization or broker but is not publicly available (e.g., there is no dissemination tool for distributing the local data to others). The timestamp for the local order data will be generated by the computer system of the organization or the broker. This would be a locally generated timestamp based on its local system information. It can be an issue that the local timestamp may not match or be in a synchronized relationship (e.g., by way of a communication exchange that establishes the synchronizations) with the timing of the market-wide data. The local timestamp and external timestamp may also operate at different increments. The system can integrate such data to generate a stream of order data that is time sequenced based on the available timing information.

A user may be able to define the concept of an entity for which a collection of accounts is to be filtered. An entity's local order data may exist in multiple order files 220 and the local order server 218 may consolidate those input sources into a consolidated local order stream for each entity.

The filtering tool 212 may directly use a formatted market-wide order data created and provided by the market order sub-system 202 and the local order data for each account as provided by the local order server 218. The filtering tool 212 is discussed in more detail below.

Figure 3:
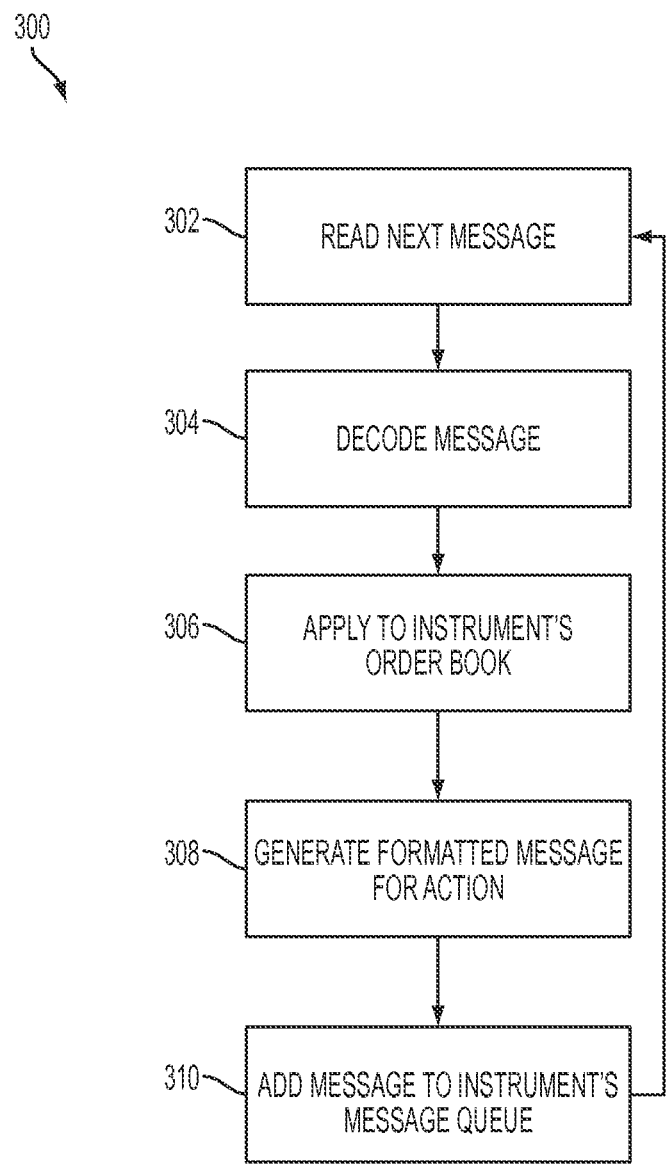
FIG. 3 illustrates a method and steps of a reader/formatter process of the market recorder, in accordance with one embodiment of the present invention.

Now referring to FIG. 3, which is a method 300 and steps of a reader/formatter process of the market recorder 204 of FIG. 2, in accordance with one embodiment of the present invention. The market recorder 204 may read the next message 302 (or a first message) in an instrument's message queue. The instrument's message queue may include information received by the marketplace feed 210. Then, the message is decoded 304. Each exchange may encode the messages into different types of formats. The system may be capable of detecting the type of format and then decoding the message. After the message is decoded, the information contained within the message is applied to the instrument's order book 306. The message's effect on the order book is recorded as a formatted message reflecting the new state of the order book 308. Next, the system may format the message into its own propriety format. Formatting the message into a propriety format may have a number of benefits. For example, the formatting of all of the messages into one format when they were received in various different formats may help to simplify the system so that eventually all of the messages will be formatted into the same format. Also, formatting messages may condense the size and make the information within the message more manageable. Also, formatting the message may help protect or encrypt the information stored within the message. Then, the formatted message is added to the instrument's message queue 310. The normalized stream produced by the market order sub-system may remove or relax the aforementioned restriction by means of a suitable output format.

Figure 4:
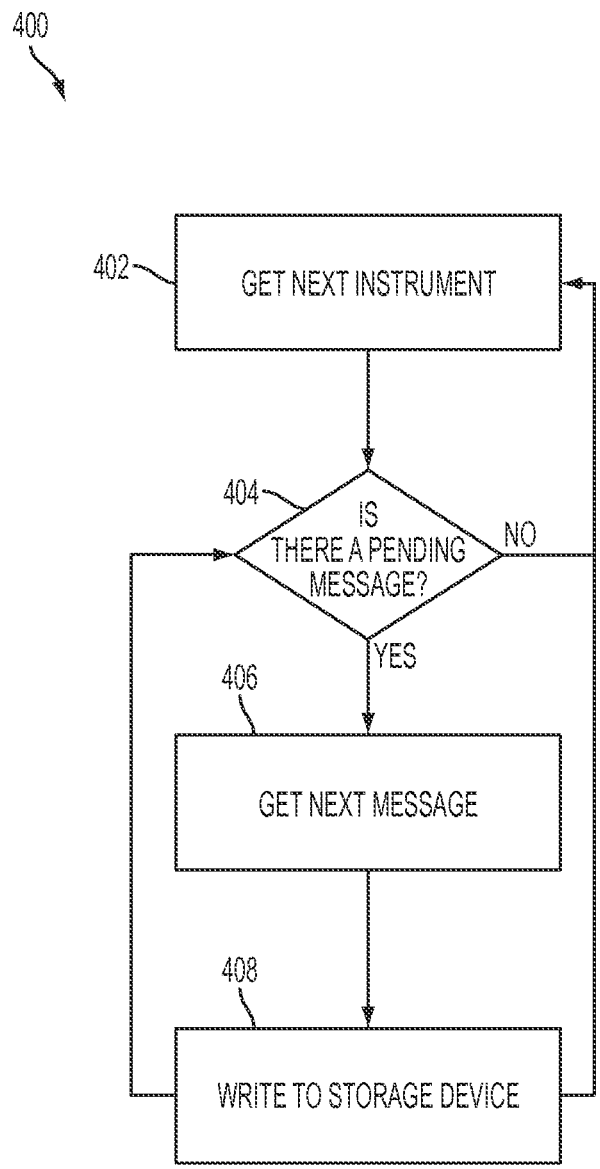
FIG. 4 illustrates a method and steps of a sequencer processor of the market recorder, in accordance with one embodiment of the present invention.

Now referring to FIG. 4, which is an exemplary method 400 and steps of a sequencer process of the market recorder 204 of FIG. 2, in accordance with one embodiment of the present invention. At step 402, the market recorder 204 retrieves that next instrument or listed security. Next, it is determined if there is a pending message for the current instrument 404. Each instrument will have at least one message in its consolidated message queue (comprised of multiple message queues each from different market venues, and combined in sequential order using the timestamps provided by the market venues). For the first determination whether there is a message for the current instrument, the determination will always be yes. Therefore, the market recorder 204 will then retrieve the pending message for the current instrument 406. Once, it has been determined that there are no more pending messages for the current instrument, the market recorder 204 will retrieve the next instrument 402 because all pending messages for the current instrument have been read or stored. After the next message is retrieved 406, the message is stored 408. After the message is stored 408, the market recorder 204 may then check to see if there is another pending message 404.

Figure 5:
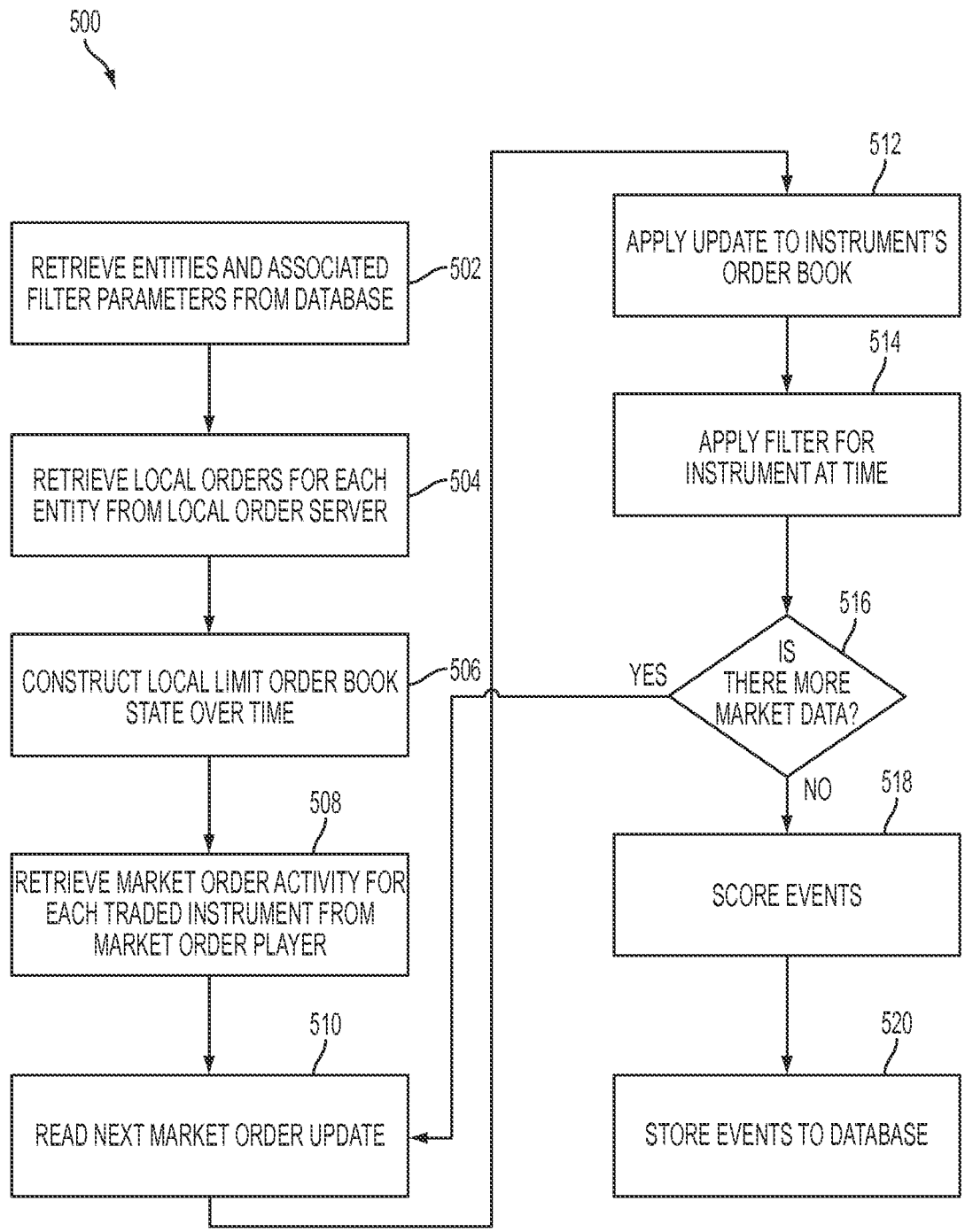
FIG. 5 illustrates an exemplary method and steps of the filtering tool, in accordance with one embodiment of the present invention.

Now referring to FIG. 5, which is an exemplary method 500 and steps of the filtering tool 212 of FIG. 2, in accordance with one embodiment of the present invention. At step 502, the filtering tool 212 may retrieve information about accounts and associated filter parameters from database 214. The filtering tool 212 may receive a list of accounts, which have local order data that needs to be processed. The filtering tool 212 may also receive a set of parameters specific to each account. At step 504, the filtering tool 212 may retrieve local orders for each account from the local order server 218. Then, a local limit order book state for each account over time may be constructed (506). A global book for the account may also be constructed, which contains the orders for each of the account's accounts. A limit order book may be a list of outstanding orders for an instrument. It may be organized into two compartments, buy and sell. For example, the buy orders may be sorted by price in descending order and the sell orders may be sorted by price in ascending order. The filtering tool 212 may also construct books at the price level granularity rather than individual order granularity. This could mean that each compartment of the order book is a price—outstanding shares pair and the price is unique. The book may also be constructed by tracking changes of each order's state over time and reflecting those changes on the book's "price-share" pairs. Additionally, information about non-limit orders may be collected and can be used during the scoring process. The local limit-order book state may be for each account for an account and then aggregated orders for an account across all accounts. At step 508, the filtering tool 212 may retrieve market order activity for each traded instruments from the market player 208. The market order update may include market data for the instruments that were traded by the accounts. The filtering tool 212 may also request the Level II data from the market player 208.

The filtering tool 212 may read the next market order update and parse out the instrument for each time entry (510) or timestamp. Each market update message may apply to an instrument and has a timestamp associated with it. At step 512, the filtering tool 212 may apply an update to the instrument's market-wide global order book based on the information parsed from the market order update. At step 514, the filtering tool 212 may apply a filter for the instrument at a certain time, which might compare local order data to market order data and generate an event or update an existing an event. The filtering tool 212 may then determine if there is more market data (516). If there is more market data, then the next market order update is read (510). If it is determined that there is not more market data then the events for the instrument are scored (518) so that they can be ranked in order of severity. A score represents a corresponding level of compliance significance of the event. Events are described in more detail below. At step 520, the events are stored in the database 214 and become accessible to the viewer tool 216.

Figure 6:
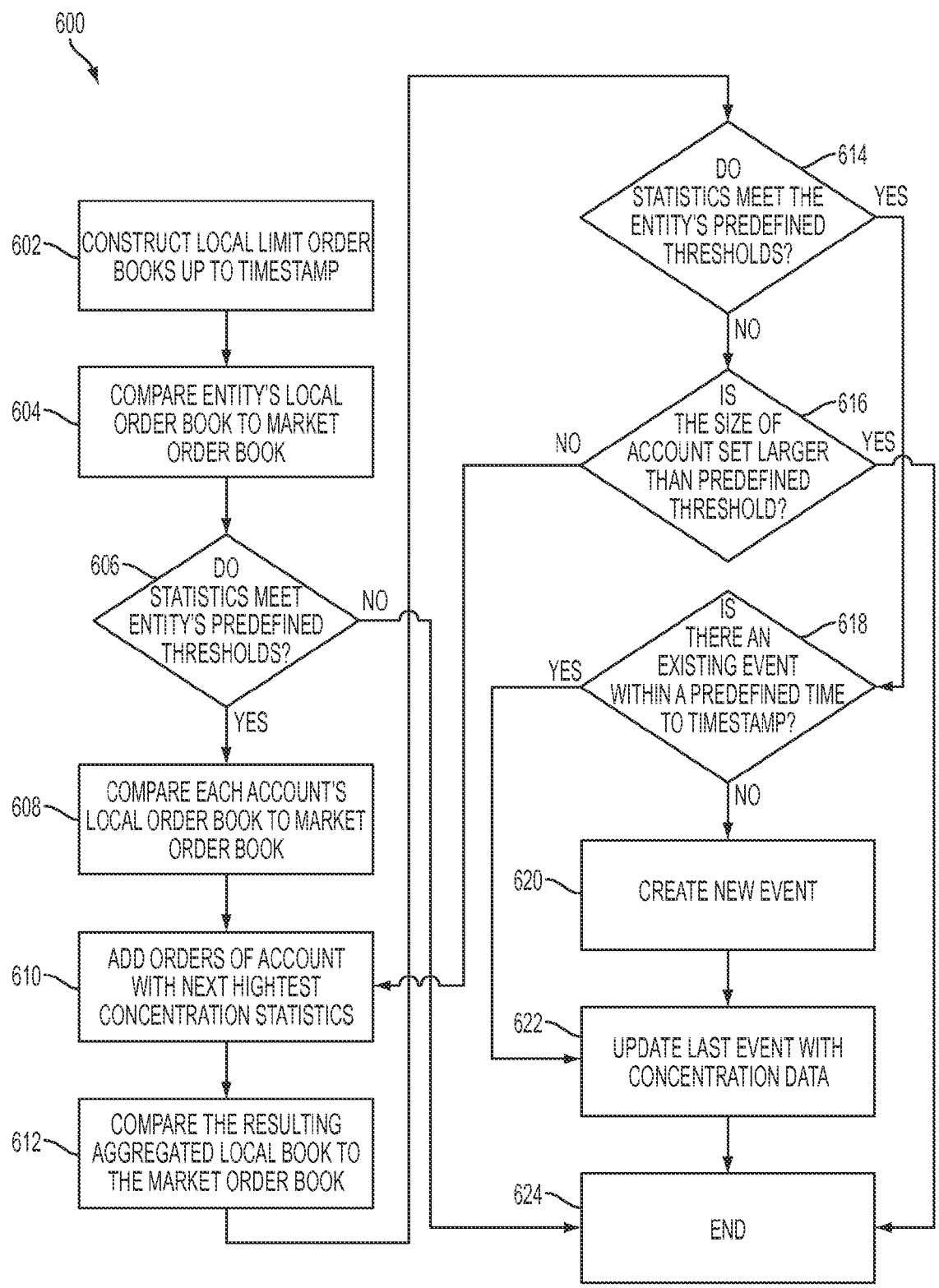
FIG. 6 illustrates another method and steps of the filtering tool, in accordance with one embodiment of the present invention.

Now referring to FIG. 6, which is another exemplary method 600 and steps of the filtering tool or the compliance event detection module, in accordance with one embodiment of the present invention. The filtering process may be performed for all of the accounts that have traded an instrument. After the application of the last update (step 512), the market wide global book may be constructed up to the timestamp associated with the update message (of step 512). The local books associated with the account are retrieved at the state that they existed just prior to the timestamp (602). At step 604, the account's local order book (including all accounts) may be compared to the global market book. The comparison may also be referred to as calculating the order concentration. The comparison may include comparing share concentration, number of distinct price tiers where user's local orders are present, and quantity of user's open shares on the active portion of the market book. The share concentration may include what percentage of the active portion of the visible book is occupied by the user's orders (local book). The active portion of the visible book may consist of the top N levels on each side, where N is a predefined constant per each account or security. For example, ten may be a typical N.

At step 606, it is determined whether the above statistics meet or exceed an account's or a security's predefined thresholds and if it does, the given order state at the current timestamp is part of an event. It may be determined if the current state is a continuation of a prior event, which needs to be updated. Otherwise, a new event will be created. Thresholds may be different in low volume versus high volume data. When it is determined that the statistics do meet or exceed an account's or a security's predefined thresholds, each account's local order book is compared to the market order book (608). If it is determined that the statistics do not meet or exceed the account's or the security's predefined thresholds, then no subset of its accounts can meet them and the filtering is completed for the last update (624). Each listed security can have a corresponding threshold requirement or set of threshold requirement. The threshold requirement can be implemented to vary based on the characteristics of the listed security (e.g. high volume, high price). The system can provide users with an interface capability that permits users to enter and therefore, specify the threshold requirement(s) for any particular listed security.

An event may be an instance in time during which the local order flow occupies a large concentration on the market and may be exerting undue influence on market-wide pricing. An event may consist of an instrument name, a side (bid or ask), and a time interval (start time, end time, peak time). An event could also contain a score, which may be assigned at a later step. The determination of a concentration measurement may be calculated in many different ways, such as average, minimum and maximum share concentration; number of distinct price tiers where user's local orders are present; quantity of user's open shares on the active portion of the market book; minimal set of accounts that trigger event; average, minimum and maximum weighted share concentration; open shares on the side opposite to the concentration; Immediate or Cancel (IOC) order shares entered on the side opposite in between the start time and end time; shares traded on the side of the concentration during the event; and shares traded on the side opposite to the concentration during the event.

The identification of whether compliance-related event has occurred can rely on data such as local timestamps, external timestamps, or other time reference. Other data as explained herein can be used and in response, an event is detected and a score generated for the event.

The scoring algorithm may assign a numerical score to an event, which combines multiple quantities that each measure an aspect of an event. Each aspect may become a component of a score. For each component, there may be a defined a minimum value and a maximum value. It also might be determined and stored whether the input values of the component have a direct or inverse effect on the score. In order to define the extent to which a component influences the score, a positive weight $w_i$ for each component i must be defined:

$w=[w_1, w_2, \ldots w_n]$

Given an event, a vector may be constructed that contains the raw input values of each component of the score:

$f=[f_1, f_2, \ldots, f_n]$ where $f_i \epsilon [f_{i\ min}, c_{i\ max}]$ This is the feature vector associated with an event.

Given that the range of each component's values is known, each element can be scaled of the prior vector into a uniform interval.

$c=[c_1, c_2, \ldots, c_n]$ where $$c_i = \frac{f_i - f_{i\ min}}{f_{i\ max} - f_{i\ min}}$$

(direct component) or $$c_i = \frac{f_{i\ max} - f_i}{f_{i\ max} - f_{min}}$$

(inverse component)

Therefore, $c_i \epsilon [0,1]$ i=1 . . . n

Weights may be applied to each component, resulting in a vector that may be used for scoring.

$v=w*c=[w_1c_1, w_2c_2, \ldots, w_nc_n]$

The magnitude of vector v will be proportional to the score. The maximum magnitude of v is given by $\|c_{max}w\|=\|w\|$. The event score in the range [0, 100] is given by $$\frac{\|v\|}{\|w\|} * 100.$$

The following features of an event may determine the score and can be implemented by the system. A minimal number of accounts needed to meet the event thresholds (inverse proportional). A weighted percentage of the active portion of the visible book is occupied by the user, usually orders closer to the best price get higher weights. The number of distinct price levels where the user has local orders present. The presence of orders on the side of the book opposite to the high concentration side, both with limit orders and IOC orders. The shares traded on the concentration side, which are inversely proportional. The shares traded on the side opposite of the concentration. The determination on whether the best bid and offer mid-price moves are as expected due to microeconomic principles. The duration of the event (events that are too short or too long to be meaningful are penalized).

For example, an entity is read from the database, which comprises three accounts: A1, A2, and A3. When the entity is read, the following thresholds are also set: share concentration=50%; number of distinct price tiers where user's local orders must be present=3; minimum quantity of user's open shares on the active portion of the market book=1000; and maximum number of accounts that can be combined to trigger an event=2.

The local order feed associated with the entity is read and the local books for each account and for the entity as a whole are constructed as a function of time. The entity traded instrument is XYZ. The market order feed is requested for instrument XYZ. Each market update is applied to the market book and a comparison with the entity local book is triggered. The entity local order book will have no orders at the timestamp associated with the market update, until the first order on one of the accounts is entered. In the example that a market update at time 10:00:00.000 is received. At this point in time orders have been entered by at least one of the accounts comprising the entity. The local books are retrieved as they existed before or on 10:00:00.000

| Account A1: | | | |
| --- | --- | --- | --- |
| Bid | | Offer | |
| Shares | Price | Price | Shares |
| 1000 | 20.63 | 21.10 | 1000 (hidden) |
| 2000 | 20.62 | | |
| 1000 | 20.60 | | |
| 1000 | 20.59 | | |
| 1000 | 20.58 | | |

| Account A2: | | | |
| --- | --- | --- | --- |
| Bid | | Offer | |
| Shares | Price | Price | Shares |
| 1000 | 20.59 | | |

| Account A3: | | | |
|---|---|---|---|
| Bid | | Offer | |
| Shares | Price | Price | Shares |
| — | — | — | — |

| Entity's Aggregated Visible Local Book: | | | |
|---|---|---|---|
| Bid | | Offer | |
| Shares | Price | Price | Shares |
| 1000 | 20.63 | | |
| 2000 | 20.62 | | |
| 1000 | 20.60 | | |
| 2000 | 20.59 | | |
| 1000 | 20.58 | | |

The market-wide order book at time T is known. The following shows the entity local book side by side with the global market book:

| Bid | | | Offer | | |
|---|---|---|---|---|---|
| Total Shares | Local Shares | Price | Price | Local Shares | Total Shares |
| 1000 | 1000 | 20.63 | 21.09 | 0 | 300 |
| 2000 | 2000 | 20.62 | 21.15 | 0 | 600 |
| 500 | 0 | 20.61 | 21.18 | 0 | 1000 |
| 1500 | 1000 | 20.60 | 21.22 | 0 | 200 |
| 2000 | 2000 | 20.59 | 21.24 | 0 | 500 |
| 2000 | 1000 | 20.58 | 21.25 | 0 | 100 |
| 500 | 0 | 20.57 | 21.26 | 0 | 100 |
| 300 | 0 | 20.56 | 21.27 | 0 | 300 |
| 600 | 0 | 20.55 | 21.28 | 0 | 200 |
| 100 | 0 | 20.54 | 21.13 | 0 | 1100 |

The comparison between the local and global books is then performed, separately for each side. The share concentration may be calculated for the top ten price levels on the market book. It might then be determined if any corresponding orders exist on the local book. The visible shares may be accumulated under two variables total global shares and total local shares. The share concentration may be calculated by:

$$\frac{totallocalshares * 100\%}{totalglobalshares}$$

Bid Side:

$$\frac{7000 * 100\%}{10500} \cong 66.6\%$$

Offer Side:

$$\frac{0 * 100\%}{4400} = 0\%$$

Next, the number of distinct price tiers where user's local orders are present is calculated. The bid side equals 5 and the offer side equals 0. Then, the quantity of user's open shares on the active portion of the market book are calculated. The bid side equals 7000 and the offer side equals 0. The bid side meets the concentration thresholds while the ask side does not:

| Measurement | Value | Threshold |
|---|---|---|
| Concentration | 66.6% | 50% |
| Number of Price Tiers Present | 5 | 3 |
| Open Share Count | 7000 | 1000 |

Therefore, this information might indicate a possible event. What remains to be calculated is how many accounts are needed to meet these thresholds, and whether that number is at most 2. The comparison may be repeated between the local and global books for each individual accounts' orders. This only needs to be one for the bid side. Then, the accounts can be ranked from the highest concentration to the lowest concentration:

| Measurement | Account A1 | Account A2 | Account A3 |
|---|---|---|---|
| Concentration | 57.1% | 9.5% | 0 |
| Number of Price Tiers Present | 5 | 1 | 0 |
| Open Share Count | 6000 | 1000 | 0 |

Then, a local order book is created to store the combined orders of our minimal set of accounts. The orders of account A1 are added to the local book. The comparison is performed again and it is found that the orders of account A1 meet the thresholds. The minimal set of accounts consists of account A1. A new event is created or a prior one is updated. For this example, the filtering process is complete as account A1's orders were sufficient to meet the threshold.

Otherwise, the minimum set of accounts required for the thresholds to be met needs to be determined. There may be a predefined maximum number of accounts whose combined orders can trigger an event. At step 610, the account with the next highest concentration statistics is added to the current account. A combined local order book may be created to store the combined orders of select accounts. Initially, it may contain the orders of the account with the highest concentration. At step 612, the resulting aggregated local book is compared to the market order book. If the thresholds are met (614), a new event may be created.

If it is determined that the threshold has been met, then it might be determined if there is an existing event within a predefined time to the timestamp (618). If it is determined that there is not an existing event within a predefined time relative to the timestamp, a new event may be created (620). If it is determined that there is an existing event within a predefined time relative to the timestamp, then the last event may be updated with the concentration data (622).

If it is determined that the statistics do not meet the account's or the security's predefined thresholds, it might also be determined whether the size of the account is set larger than a predefined threshold for size of the accounts (616). If it is determined that the size of the account is set larger than the predefined threshold, then the filtering process may be finished (624). If the size of the accounts is not set larger than the predefined threshold, then the filtering process may continue to add orders to the aggregated order book of the account with the next highest concentration (610). After the update of the last event with the concentration data (622), the filtering process may be finished (624). This process may be repeated until a minimal set of accounts is found or the maximum number of accounts is reached.

Figure 7:
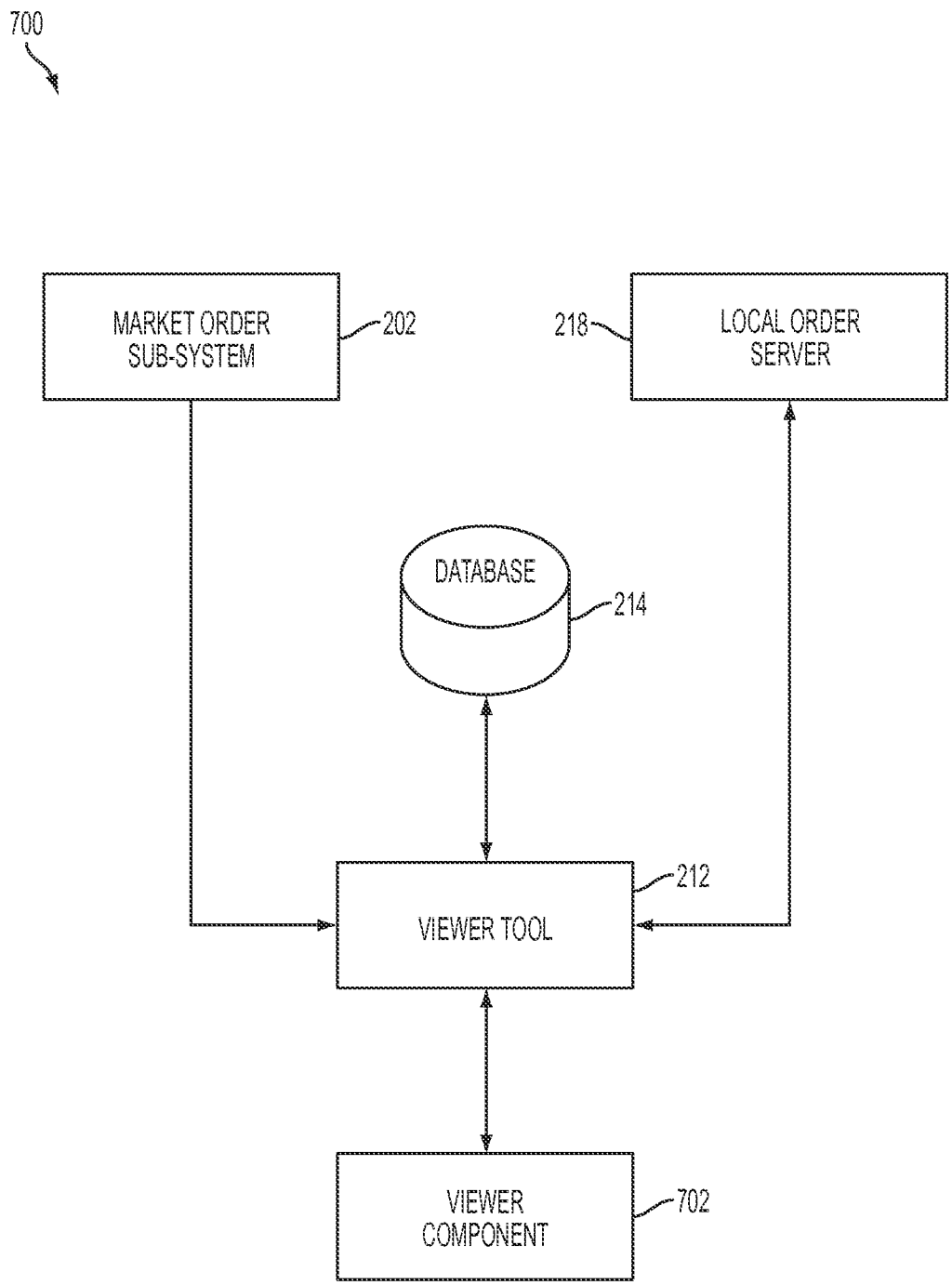
FIG. 7 illustrates a block diagram with various computer system components for use with an exemplary implementation of a system including a viewer system for comparing local securities order data to market-wide order data, in accordance with one embodiment of the present invention.

Now referring to FIG. 7, which is a block diagram with various computer system components for use with an exemplary implementation of a system 700 including a viewer system for comparing local securities order data to market-wide order data, in accordance with one embodiment of the present invention. The viewer system may contain several visual components for the inspection of market and local order data, the relationship between them and the management and viewing of events captured by the filtering tool. The viewer system may comprise a display component and a viewer tool. The display may include a computer program that displays the data visually and takes user input. The viewer tool may also include a computer program that prepares the data for viewing. The display program may run on a user's device and may be in the form of an application native to the operating system of the device or in the form of an interpreted script running in a web browser. The viewer tool program may also reside on the user's device or on one or more machines connected to the user's device and on other components of the system via a network.

The viewer system 700 illustrated in FIG. 7 may receive market data from the market order sub-system 202, local order messages from the local order server 218, events from the filtering tool (not shown) stored within the database 216, information about user event reviews, logins, security data, and any information that should be persisted between user sessions may also be retrieved from the database 216. The viewer tool 216 may perform several functions for the display program. It may filter and cache local order messages, as well as, act as a proxy for any request of information from database 216.

Figure 8A:
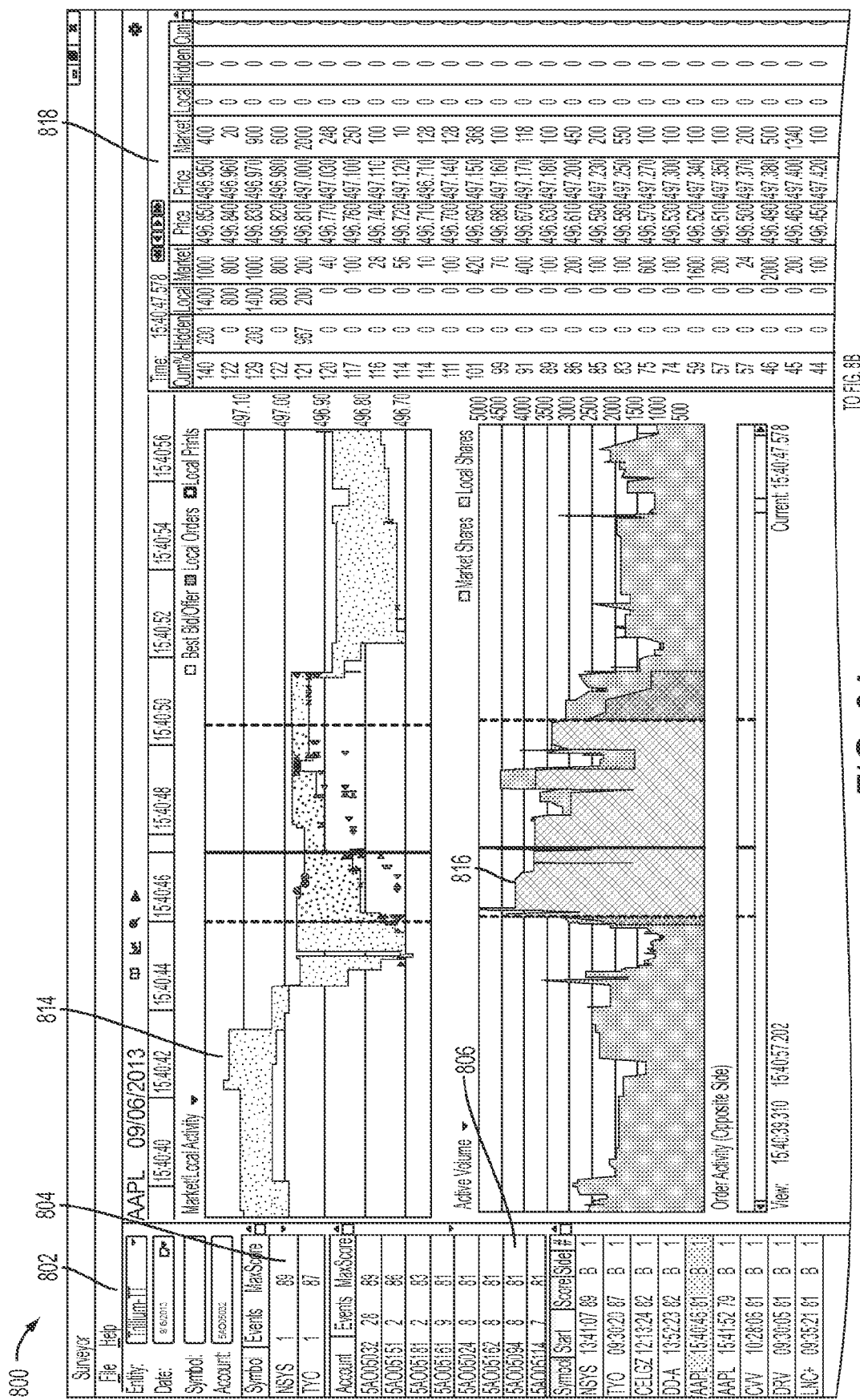
Figure 8B:
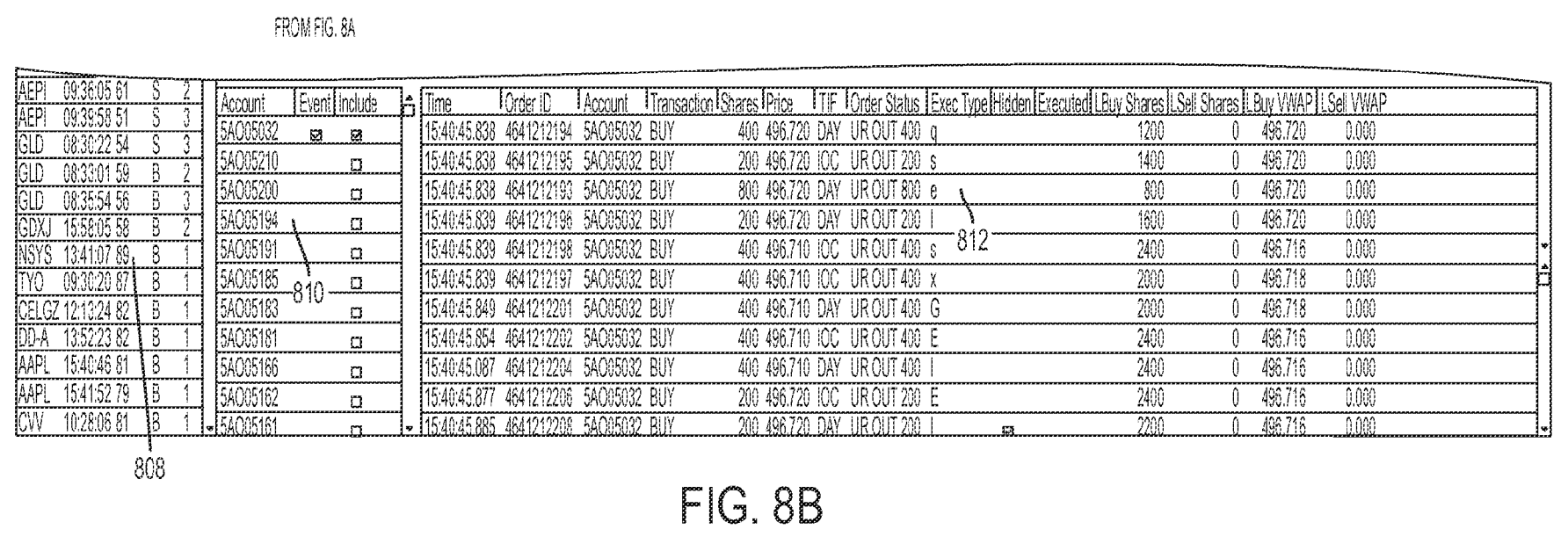

Now referring to FIG. 8, which is an exemplary screenshot 800 of the display component of a system for comparing local securities order data to market-wide order data, in accordance with one embodiment of the present invention. The display component screenshot may include a control box 802, a default listing of symbols 804, a list of local accounts 806, an event view 808, account filter view 810, order view 812, price information graph for both market and local orders 814, volume information graph for market and order flow 816, and a listing of the market-wide book and the local order book 818. The screenshot 800 of the display component may allow a user to view a slice in time of a particular event and any relevant information about the event. The display component may provide the user the ability to pause time when you see an order for any customer that is being watched and be able to view order states or other local, marketplace, or calculated data in table format in association with a graphical view of the market.

The control box 802 may provide event filtering and reporting. For example, the control box may include drop down menus or boxes for selecting different filters such as account, date, symbol and account. The date may be set as a default for yesterday's date but it may also be selected as any day in the past to view the trading activity and events for a particular date. The control box 802 may provide the user with the ability to view events for a particular account for a specified date. It may provide information about a list of events for a particular date and account, which can be additionally filtered manually or via the summary section of the display component. An automated compliance tool can be implemented that automatically stores and applies the compliance processing to the market and local data. In response, the compliance tool identifies events for all or some accounts, entities, and listed securities. With this implementation, a compliance officer can access the tool each day to view the results of the data from the pervious day's trading for her organization. If desired, indexing can be used to process and store some of the data. If desired, the identification and scoring can be performed periodically. If desired, in some embodiments, a real time or close to real time implementation can be applied (e.g., events and scoring are identified as the market data is received). The control box 802 may provide the information to be displayed in areas 806 and 808. The default listing of symbols 804 may be displayed according to a ranking of the highest scoring events for those symbols. The default listing of symbols 804 may include columns for symbols, events and a score. The list of local accounts 806 may include multiple columns, such as an account number, number of events and a score.

The event view 808 may include a list of the number of different events for the accounts. The event view 808 may also include information about the event, which may include start and end times, the side of the market that the event was detected on, duration, the event's score as calculated by the filtering tool and an indication as to whether the event has been reviewed by a user of the system. The selection of an event may display information pertaining to all market data for the instrument on the date in question or during a time period and all local orders. Specific events may be searched for using filtering commands. These filters may be applied to all summary views to help the user local events, which likely need attention.

The account filter view 810 may display a list of all accounts which have sent orders for the instrument and date currently loaded in the control box 802. The account filter view 810 may also contain a visual indication as to whether or not the account was a participant in the event currently loaded and a toggle which allows the user to add or remove the local orders for the specified account from all calculations and viewer components.

The order view 812 may also display details about each individual orders for whichever account is selected in the account filter view 810. Also, if a user selects on an order in the order view 812 one or both of the graphs 814 and 816 may update to reflect the information about the selected order. The order view 812 may included detailed information about the events, such as a time field, order ID, account number, transaction type, price, time in force (TIF), order status, execution type, hidden, executed, LBuy Shares, LSell Shares, Lbuy VWAP, and/or LSell VWAP. These are just examples of fields that could be included. It should be appreciated that the present invention is not limited to only these examples. The TIF column may represent the time of day that the order was in force. LBuy Shares may represent the number of cumulative outstanding buy shares for that symbol for that trader. LSell Shares may represent the number of cumulative outstanding sell shares for that symbol for that trader. Visible orders are orders that are viewable and available for anyone to see. Hidden orders may be a number of different types of orders, which are not readily available for others to see. For example, a hidden order may be an order that has been requested to be hidden until after the order is executed. Also, a hidden order may be an IOC, which will be visible if the order is executed. Also, the order may be waiting on line to be executed and might not be visible. Another reason there might be a hidden order could be it has been submitted by an alternative trading system or a dark pool and no one has access to those orders.

The order view 812 may contain a list of all of the local orders for the current instrument on the date entered into the control box 802 and/or filtered by the account filter view 810. The order view 812 may include various information for each line about the local order book at the time the order was placed. This may also include the total visible shares on the book for this account on both sides of the market and the volume weighted average price (VWAP) of the local book on both sides of the market. These numbers may be for the entire local order book and are not limited to the active market price levels. Additionally, the order messages may be flagged if there are any executions associated with the order at any point in the day and if any part of the order was hidden. In order to assist in the viewing of the orders in the price graph 814, selecting any order in the order view 812 may highlight it in one or both of the graphs 814 and 816.

The display component may display trading activity graphically on two charts: one which displays price information for both market and local orders 814 and one which displays volume information for both the market and the local order flow 816. When an event is selected within area 808, for example, the graphs 814 and 816 may additionally indicate the time frame of the event by highlighting it in both charts 814 and 816. The charts may share a single set of controls for adjusting the time frame that is being viewed, including the ability to select a specific instance in time. The graph can include indicators marking the start and end of the event.

Figure 10:
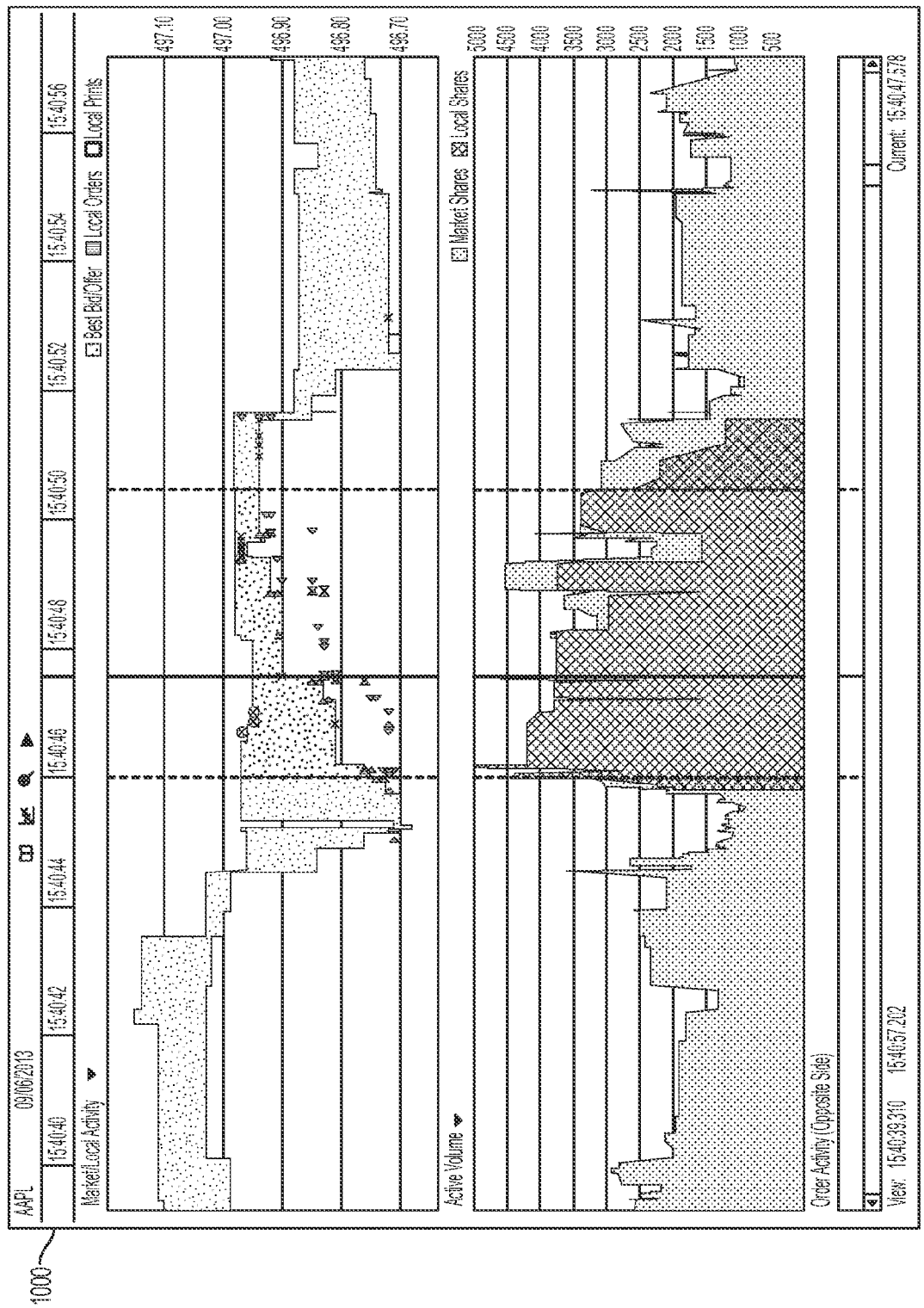
FIG. 10 illustrates a exemplary screenshot that shows a larger view of the graphical portion of the viewer system, in accordance with one embodiment of the present invention.

The price information graph 814 may contain the following information, plotted over time: the best bid and ask in the market, which may be calculated using the limit book data provided by the market player; all local order messages, including new order messages, cancels and executions; and the volume weighted price of local book, which fall within the price levels defined by the active book for each point in time. The price information graph 814 may also be referred to as market/local order activity. The price information graph 814 may also include controls that provide manipulation of the view or look of the graph, such as book view toggle, zoom, middle toggle, play function. The book view toggle may turn off or on the view of book 818. The zoom function may provide the ability to zoom both graphs in different views, such as percent of market share, time period, etc. The middle graph toggle will turn off or on the middle graph or volume information graph 816 from the display component. The play function may provide the ability to view the listed events as a progression of time. The settings of the play function may be changed based on the user's preferences. Both of the graphs 814 and 816 may also include one or more dashed lines that represent the beginning and end of the time of the selected event. The graphs 814 and 816 may also include a solid line that indicates the specific instance in time of the selected event. The price graph 814 may also include one or more indicator markers to give some context to the graph. For example, the price graph may include X's and left-pointing triangles and right-pointing triangles. The X's may indicate executions or more specifically local executions. The right-pointing triangle may indicate the start of an order and the left-point triangle may indicate the cancellation of an order. Also, a circle may appear and that may indicate an IOC order. Also, these items may be color-coded to indicate more information. A scaled view of 814 is shown in FIG. 10.

The display component 800 may also include a print view that includes a report of both the market and local data. The user may be able to select a particular execution and it may be highlighted in the price graph 814 and the volume graph 816. The user may also be provided with the ability to export the print view to a pdf. The print view may also provide the user the ability to share the report or print view with other users, such as by email, printing out a copy, etc.

The volume information graph 816 may display the total volume of visible orders on all exchanges within the active book, as well as the total volume of the local visible orders, which fall within the price range defined by the active book. These values may be displayed for the side of the market that is specified by the event being investigated or displayed. This view may be toggled between one which displays the total volume in shares and one which displays the percentage of the local order volume as compared to the total market volume. Below this chart may be an indicator, which indicates if there are any local orders, visible, hidden or IOC, which are open during the time being displayed. A scaled view of 816 is shown in FIG. 10.

The listing of the market-wide book and the local order book 818 may contain price level data for both the market and the local order book for a specific instance in time as selected by the user on any of the chart controls. It may also display total market share volumes for each price level on both sides of the book and both total visible and total hidden order volume for local orders during the time indicated. For each side of the book, a running concentration of visible local orders may be displayed as a percentage of the market. The current levels considered active for the market may also be indicated in book view 818 by way of shading, which deemphasizes the portion of the book not included for the purposes of calculating the concentration levels used by the filtering tool 212. For example, only the top ten highest concentration may be at the top of the book listing and the rest grayed out.

Book 818 may also provide a step-through functionality (or playback) that allows a user to step forward or backward for each item or message listed in the book. There might also be a function that allows a user to step forward or backward through the book at a predetermined time interval, such as 10 milliseconds. The view of the market and the local order books may be advanced by an absolute time, time offsets, market message offsets or local order message offsets. In order to provide a timely playback, the viewer tool may use several different techniques to speed the calculation of the order book when moving backwards or forwards in time.

Requests for a new view of the book may be made by selecting an event in the event view 808, moving a time selector in the price chart 814 or volume chart 816, or by entering time into the book view 818. Any of these actions may cause a request for a new view of the book by time to the viewer tool, which in turn may calculate a new view of the book given the current state. This may be done using message indexes, which are now stored within each snapshot of the market. The new view of the book may then be either calculated by playing individual messages or by completely clearing the book and applying a snapshot and then playing the differences.

Once an event has been reviewed by a user, it may be marked for escalation via the event view 808. These escalation requests may then be stored in the database used to notify managers that additional review may be necessary depending on settings within the database.

Figure 9:
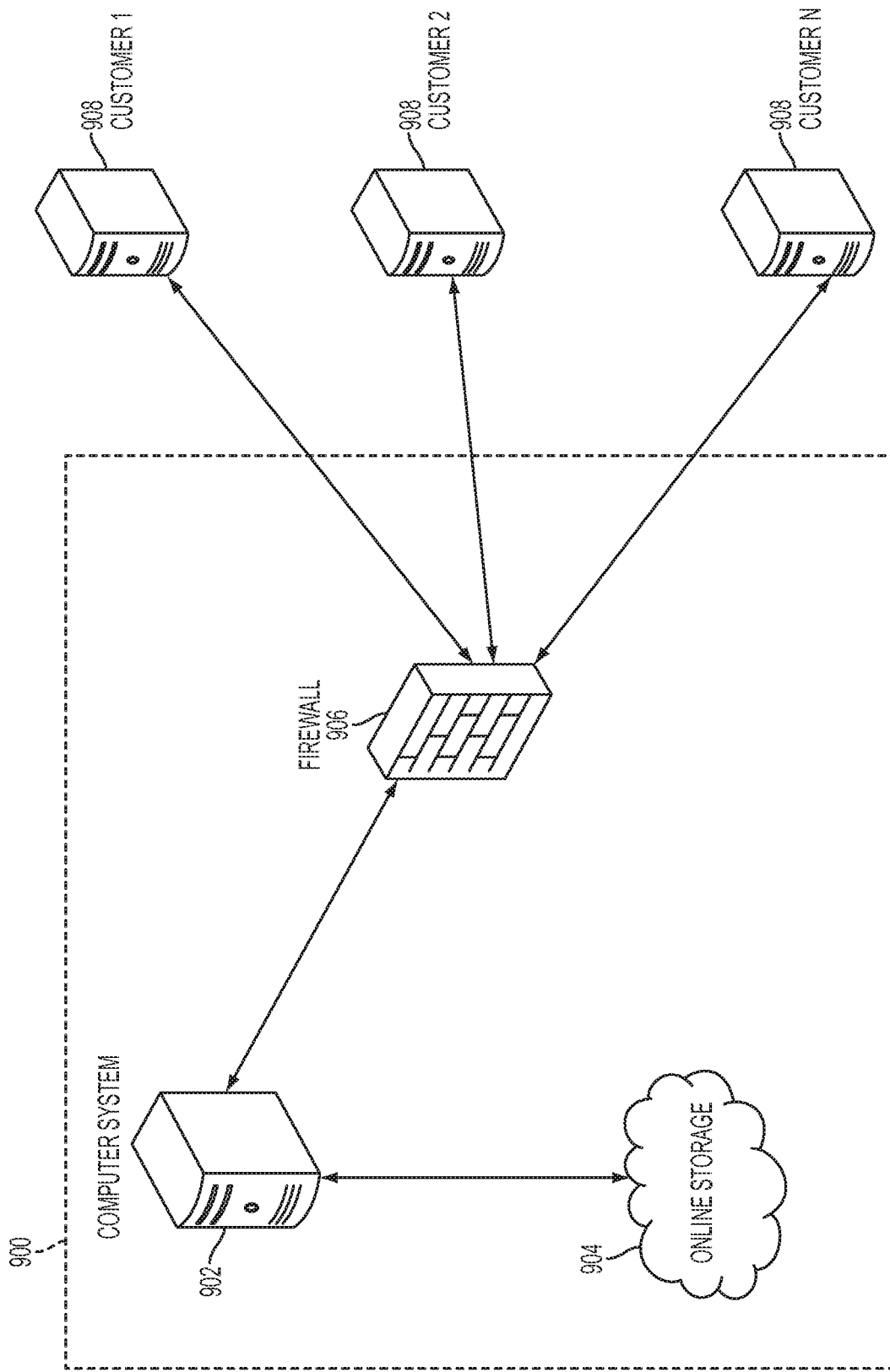
FIG. 9 illustrates another block diagram with various computer system components for use with an exemplary implementation of a compliance system in accordance with one embodiment of the present invention.

FIG. 9 shows a system 900 that includes one or more components that includes one or more servers, computers, storage devices, etc. The components may be connected to a communication infrastructure (e.g., a communications bus, cross-over bar, or network). Other arrangements are also contemplated.

In this example, compliance system 900 includes a computer system 902, online storage 904, and a firewall 906. Compliance system 900 is configured to communicate with one or more customer computer systems 908. System 900 is not limited to only the shown components. System 900 may also include features or components described above. For example, Computer system 902 can implement the compliance related features described above and can include market order sub-system 202 or system 200 of FIG. 2. Computer system 902 can include the components that generate signal, packets, or communications that generate displays on client devices such as client devices as part of customer computer systems (e.g., mobile devices, laptops, or tablets) using a browser interface or a resident software application such as a mobile app. Online storage 904 may be a privately managed storage infrastructure that receives and contains customer local order data and other data mentioned above. Online storage 904 may include one or more databases and one or more servers, etc. Online storage is usually a distributed computer system that is available over a public network such as the Internet and has the ability to run a program on many connected computers at the same time. Online storage 904 can include a data center hosting arrays of servers and databases including virtual servers. The data center will typically have an arrangement that secures and segregates customer data or applications using physical or logical arrangements. The data center will also include appropriate firewalls or other security measures to protect against unauthorized access. Online storage 904 can also have the capability to automatically scale resources (up or down) to match necessary storage or processing capabilities required by its customer(s). Online storage 904 may be in communication with computer system 902. The first database, second database, and any other storage device mentioned above may be part of the online storage. If desired, customer computer system can send local order data to online storage 904 without the data passing through computer system 902 or passing through the network in which computer system 902 resides. If desired, computer system 902 can storage local, market wide, and other data in local databases rather than rely on a online storage.

Firewall 906 may also be in communication with computer system 902. Firewall 906 may be used to control access to system 902, as well as the information stored within storage 904. A firewall is usually a software or hardware-based network security system that controls the incoming and outgoing network traffic by analyzing the data packets and determining whether they should be allowed through or not, based on a rule set. A firewall establishes a barrier between a trusted, secure internal network and another network (e.g., the Internet) that is not assumed to be secure and trusted. Firewall 906 may include multiple firewall equipment and may include separate firewalls for computer system 902 and online storage 904. Online storage 904 may also have a firewall between computer system 902 and itself Customers 908 may be any number of customers that wish to connect to computing system 902. In the architecture as shown, each customer 908 may connect to computer system 902 through firewall 906. Also, each customer 908 may have access to separate portions of online storage 904. Customer would not usually have access to information pertaining to a different customer. It should be appreciated that many different security measures may be in place either by the firewall 906, computer system 902 or online storage 904 to prevent access to information not pertaining to the specific customer, such as passwords, encryption, passkeys, etc. Also, each customer 908 might be completely separate entity's that are not co-located and not associated with each other in any way. Customers 908 may provide information such as the local order files 220 of FIG. 2.

FIG. 10 shows an exemplary screenshot 1000 that is a larger view of the graphical portion of the viewer system of the present invention. A scaled view of graphs 814 and 816 of FIG. 8 is shown.

A computing device can include a computer, computer system or other programmable electronic device, including a client computer, a server computer, a portable computer (including a laptop and a tablet), a handheld computer, a mobile phone (including a smart phone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

Further, the terms "computing device", "computer device", "computer system," "computer" and "machine" are understood to be interchangeable terms and shall be taken to include any collection of computing devices that individually or jointly execute a set (or multiple sets) of instructions to perform any one or more of the methods or features discussed herein.

The local storage can include volatile memory (such as RAM) and/or non-volatile memory (such as ROM as well as any supplemental levels of memory, including but not limited to cache memories, programmable or flash memories and read-only memories). The computing device or hand-held device can include one or more processing devices (e.g., one or more central processing units (CPUs), one or more graphics processing units (GPUs), one or more microprocessors ($\mu$P) and similar and complementary devices) and optional media devices (e.g., a hard disk module, an optical disk module, etc.). Additionally, any storage techniques used in connection with the presently disclosed method and/or system may invariably be a combination of hardware and software.

One or more features illustratively described herein can be implemented individually or in various combinations. The present system, method, or related inventions also relate to a non-transient computer readable medium and can include a one or more software applications that implement embodiments of the system on hardware. The software application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art.

Features or characteristics described in one context, process, or device are applicable to other context, process or devices described herein. The steps of the processes illustratively described herein can be performed in a different order, if desired. Also, steps could be added or removed from the processes illustratively described herein. The processes, features, or steps illustratively described herein can be implemented in software and data (in computer readable medium, transient and/or nontransient) using the described examples of hardware and network configurations.

It should be understood that feature or functionality described herein such as by way of different functional block diagrams can be implemented with one or more computer systems (a single computer or multiple computers) and with one or more software modules that can be implemented in a single or multiple computer to provides or more of the feature or functionality.

For the purpose of clarification, to the extent that the description herein does not explicitly state that certain described portions are computer implemented or are carried out using computers, it would be understood to those of ordinary in the skill in the art from the specification that a computer implemented configuration is contemplated.

In general, the use of "may" or "can" indicates that this one implementation, but technology is not limited just to this one implementation.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A computer-implemented method for detecting, identifying, and addressing local trading behavior that signifies compliance concerns, comprising:
   receiving, by a compliance computer system, market-wide order data from a plurality of different sources of marketplace data, wherein the market-wide data comprises a market-wide history of market-wide order book states in correspondence with an incrementing external timestamp;
   consolidating the market-wide order data from the plurality of different sources of marketplace data into a consolidated stream of the market-wide order book states;
   storing the consolidated stream of market-wide order data in a first database;
   receiving, by the compliance computer system, local order data, wherein the local order data comprises data that identifies local order book states and a corresponding local timestamp, and wherein at least a portion of the local order data comprises a history of local orders in correspondence with the local timestamp and includes one or more hidden local orders that are received from a source external to the plurality of different sources of marketplace data;
   storing the local order data in a second database;
   receiving a list of accounts corresponding to local order activity;
   implementing a compliance event detection module in the compliance computer system;
   applying, by the compliance computer system, the compliance event detection module to the stored local order data and the market-wide order data, comprising:
      integrating a portion of the market-wide order data and a portion of the stored local order data into a combined stream of local order and market-wide order states;
      comparing, at a particular time reference, a state of at least one account's local order book in a listed security to a state of a market-wide order book in a particular listed security;
      in response to the comparing, identifying a concentration of local orders comprising a percentage of the market-wide order book on one side of the market;
      identifying an individual compliance event comprising:
         applying a plurality of factors to the state of the account's local order book in the listed security and the state of the market-wide order book in the listed security, and in response to the applying, identifying a compliance-related event based on: the identified concentration, one or more local orders by the account or a related account on the other side of the local order book, a corresponding local timestamp, one or more compliance threshold requirements that are variable based on the particular listed security, and a corresponding external timestamp; and
      generating a score in association with the compliance-related event, wherein the score represents a corresponding level of significance of the compliance-related event; and
   providing a user-interactive interface that:
      displays a view of the combined stream of local order and market-wide order states during the compliance-related event;
      marks the compliance-related events;
      allows selecting sequentially and moving through the combined stream of local order and market-wide order states; and
      allows viewing the combined stream of local order and market-wide order states in graphical and table formats before, during, and after the compliance-related event.

2. The method of claim 1, further comprising:
   processing the market-wide order data and the local order data; and
   determining that a subsequent event in the local order book is part of the identified compliance-related event.

3. The method of claim 1, wherein identifying the compliance-related event is further based on a number of price levels used by the account and a quantity of local orders by the account in connection with that particular security.

4. The method of claim 1, further comprising:
   setting filtering or processing parameters associated with each account, data source, or listed security.

5. The method of claim 1, further comprising:
   receiving market-wide data from an external network; and
   receiving local market data from an internal log of local trading activity.

6. The method of claim 5, wherein the internal log is received from an external network that is separate from the external network for the market-wide data, and wherein the internal log is generated and maintained by a network that receives local orders for transmission to exchanges.

7. The method of claim 1, wherein a portion of the steps are performed using an online storage accessible through a firewall that protects the online storage.

8. The method of claim 1, further comprising:
   providing a user with an option to select and save a threshold criteria for each particular listed security that will trigger the identifying of a compliance-related event for that listed security.

9. The method of claim 1, further comprising:
   considering a plurality of accounts as if they were a single account; and
   providing a user with an option to select which accounts should be included in the view.

10. The method of claim 1, further comprising:
    implementing the compliance event detection module to automatically process local market data on a periodic basis and identify a plurality of compliance-related events and an associated score for each.

11. The method of claim 10, further comprising:
    automatically applying the compliance event detection module on a day-after trading basis.

12. The method of claim 1, further comprising:
combining different groups of accounts in an account; and
applying the compliance event detection module to evaluate whether a compliance-related event has occurred.

13. The method of claim 1, wherein the external timestamp and the local timestamp are from separate clocks without having a synchronization relationship.

14. A computer system for detecting, identifying, and addressing local trading behavior that signifies compliance concerns, comprising:
one or more computers associated and connected to non-transient electronic storage containing data and computer-executable instructions, wherein the one or more computers and electronic storage are together configured to comprise:
a market order component configured to:
receive market-wide order data from a plurality of different sources of marketplace data, wherein the market-wide data comprises a market-wide history of market-wide order book states in correspondence with an incrementing external timestamp;
consolidate the market-wide order data from the plurality of different sources of marketplace data into a consolidated stream of the market-wide order book states;
a first database configured to store the consolidated stream of market-wide order data;
a local order component configured to:
receive local order data, wherein the local order data comprises data that identifies local order book states and a corresponding local timestamp, and wherein at least a portion of the local order data comprises a history of local orders in correspondence with the local timestamp and includes one or more hidden local orders that are received from a source external to the plurality of different sources of marketplace data; and
receive a list of accounts corresponding to local trading activity;
a second database configured to store the local order data;
a compliance event detection module that is configured to:
apply compliance event detection to the stored local order data and the market-wide order data by:
integrating a portion of the market-wide order data and a portion of the stored local order data into a combined stream of local order and market-wide order states;
comparing, at a particular time reference, a state of at least one account's local order book in a listed security to a state of a market-wide order book in a particular listed security;
in response to the comparing, identifying a concentration of local orders comprising a percentage of the market-wide order book on one side of the market;
identifying an individual compliance event comprising:
applying a plurality of factors to the state of the account's local order book in the listed security and the state of the market-wide order book in the listed security, and in response to applying, identifying a compliance-related event based on: the identified concentration, one or more local orders by the account on the other side of the local order book, a corresponding local timestamp, one or more compliance threshold requirements that are variable based on the listed security, and a corresponding external timestamp; and
generating a score in association with the compliance-related event, wherein the score represents a corresponding level of significance of the compliance-related event; and
a viewer component that is configured to:
provide a user-interactive interface that:
displays a view of the combined stream of local order and market-wide order states during the compliance-related event;
marks the compliance-related event;
allows selecting sequentially and moving through the combined stream of local order and market-wide order states; and
allows viewing the combined stream of local order and market-wide order states in graphical and table formats before, during, and after the compliance-related event.

15. The system of claim 14, wherein the compliance event detection module is further configured to process the market-wide order data and the local order data, and determine that a subsequent event in the local order book of that account is part of the identified compliance related event.

16. The system of claim 14, wherein identifying the compliance related event is further based on a number of price levels used by the account and a quantity of local orders by the account in connection with that particular security.

17. The system of claim 14, wherein the compliance event detection module is further configured to set filtering or processing parameters associated with each account, data source, or listed security.

18. The system of claim 14, wherein the market order component is further configured to receive market-wide data from an external network, and wherein the local order server is further configured to receive local market data from an internal log of local trading activity.

19. The system of claim 18, wherein the internal log is received from an external network that is separate from the external network for the market-wide data, and wherein the internal log is generated and maintained by a network that receives local orders for transmission to exchanges.

20. The system of claim 14, wherein a portion of the steps are performed using an online storage accessible through a firewall that protects the online storage.

21. The system of claim 14, wherein the viewer component is further configured to provide a user with an option to select and save a threshold criteria for each particular listed security that will trigger the identifying of a compliance-related event for that listed security.

22. The system of claim 14, wherein the viewer component is further configured to consider a plurality of accounts as if they were a single account, and provide a user with an option to select which accounts should be included in the view.

23. The system claim of 14, wherein the compliance event detection module is further configured to automatically process local market data on a periodic basis and identity a plurality of compliance-related events and an associated score for each.

24. The system of claim 23, wherein the compliance event detection module is further configured to automatically apply the module on a day-after trading basis.

25. The system of claim 14, wherein the compliance event detection module is further configured to combine different groups of accounts in an account, and evaluate whether a compliance-related event has occurred.

26. The system of claim 14, wherein the external timestamp and the local timestamp are from separate clocks without having a synchronization relationship.

* * * * *